(12) United States Patent
Santella et al.

(10) Patent No.: US 6,284,058 B1
(45) Date of Patent: Sep. 4, 2001

(54) METHOD OF ALUMINIZING METAL ALLOYS BY WELD OVERLAY USING ALUMINUM AND ALUMINUM ALLOY FILLER METAL

(75) Inventors: Michael L. Santella, Knoxville; Vinod K. Sikka, Oak Ridge; Srinath Viswanathan, Knoxville, all of TN (US)

(73) Assignee: U.T. Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/396,598

(22) Filed: Sep. 15, 1999

(51) Int. Cl.[7] .................................................. C23C 22/70
(52) U.S. Cl. ..................... 148/242; 148/281; 148/525; 148/535; 219/76.1; 428/457

(58) Field of Search ..................................... 148/242, 281, 148/525, 535; 219/76.1, 76.14, 76.15, 76.16; 428/457, 472.2

(56) References Cited

U.S. PATENT DOCUMENTS

3,857,165 * 12/1974 Vernam et al. ......................... 29/504
5,321,224 * 6/1994 Kamimura et al. ................. 219/76.15
5,900,170 * 5/1999 Marcin, Jr. et al. ............. 219/121.66

* cited by examiner

*Primary Examiner*—John Sheehan
*Assistant Examiner*—Andrew L. Oltmans
(74) *Attorney, Agent, or Firm*—John B. Hardaway, III; Hardaway/Mann IP Group

(57) ABSTRACT

A method of aluminizing metals with a coating of aluminum or aluminides.

12 Claims, 2 Drawing Sheets

METHOD OF ALUMINIZING METAL ALLOYS BY WELD OVERLAY USING ALUMINUM AND ALUMINUM ALLOY FILLER METAL

The U.S. Government has rights in this invention pursuant to contract No. DE-AC05-96OR22464 between the Department of Energy and Lockheed Martin Energy Research Corporation.

BACKGROUND OF THE INVENTION

This invention relates generally to the art of coating and more particularly to a new process for coating metals with an environmental resistent coating.

Aluminizing is the process of forming an aluminum or aluminum alloy coating on a metal either by dipping in a bath of molten aluminum (hot dipping); coating by a thermal spray process (hot spraying); or, by immersing in a mixture of aluminum powder combined with other chemicals (pack cementation). Aluminizing is used to improve the environmental resistance of a wide variety of alloys. The increase in surface concentration of aluminum or the formation of aluminide coatings often provides superior resistance to oxidizing, sulfidizing, or carburizing conditions. A drawback of hot dipping and pack cementation is that the parts being aluminized must be of a size and shape that is conducive to immersion in a containment vessel. A drawback of thermal spraying is that only a thin layer of alloy reacts with aluminum during the process to form an aluminum alloy or aluminide.

Clear need exists to be able to provide a better aluminizing process.

SUMMARY OF THE INVENTION

It is thus an object of this invention to provide a novel process for aluminizing metal or alloy.

It is a further object of this invention to provide such an aluminizing process which provides considerably thicker coatings than have heretofore been available.

These as well as other objects are accomplished by welding an aluminum layer onto a metal substrate to provide a thick aluminized layer on the surface thereof.

DETAILED DESCRIPTION

In accordance with this invention it has been found that aluminizing utilizing welding greatly improves the environmental resistance of a wide variety of alloys, including iron-basest alloys, cobalt-based alloys, nickel-based alloys, titanium-based alloys, and refractory metal alloys. Utilizing the process of this invention relatively thick aluminum alloy or aluminide layers are formed. Additionally, the welding technology that the subject invention relies on is widely practiced in industry for shop floor and field site fabrication, and is portable. It can be used to aluminize parts or structures wherever they are located. The size of partial structures does not limit its utility; extremely large structures can be aluminized by subject invention. For example, the subject invention can be used for aluminizing of already installed boiler tubing. Various other advantages and features will become apparent from a reading of the following detailed description given with reference to the various figures of drawing.

This invention involves making weld overlay deposits on iron-based alloys, e.g., and various other alloys using commercially pure aluminum or aluminum alloy filler metal for a filler metal. The welds are made preferably using the gas tungsten arc welding (GTAW). The weld overlays can be made either manually or automatically.

During the process, a molten weld pool is first established on the base metal being aluminized. Then, aluminum is fed into this weld pool where it melts and forms an alloy in-situ with the base alloy. The resulting weld deposit is an alloy of aluminum and base metal.

Figure 1:
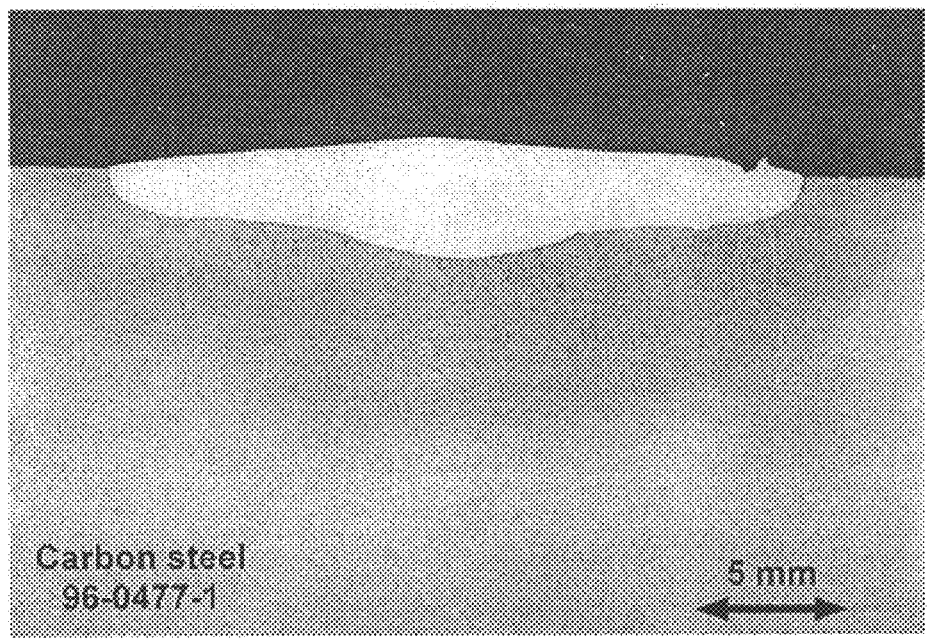
FIG. 1 is a photomicrograph of a weld bead made by depositing aluminum wire on carbon steel.

A cross-section view of a weld bead deposited on plain carbon steel plate is shown in FIG. 1. This figure shows that the weld bead has an average thickness of about 3 mm. There is no indication of chemical segregation in FIG. 1, which was confirmed by examination at higher magnification. This means that the aluminum is uniformly mixed in the deposited weld bead. Also, there is no indication of cracking or other weld defects in FIG. 1. Examination of weld beads made under identical conditions by electron microprobe analysis determined that their concentration of aluminum was about 12.25 wt % (22.4 at %).

For any particular overlay deposit made by GTA welding, its aluminum concentration will depend substantially on the welding arc current, welding travel speed, filler metal wire diameter, and the aluminum feed rate into the molten weld puddle. Varying any one of these parameters independently of the other two will result in a change in the aluminum concentration of the weld overlay deposit.

Figure 2:
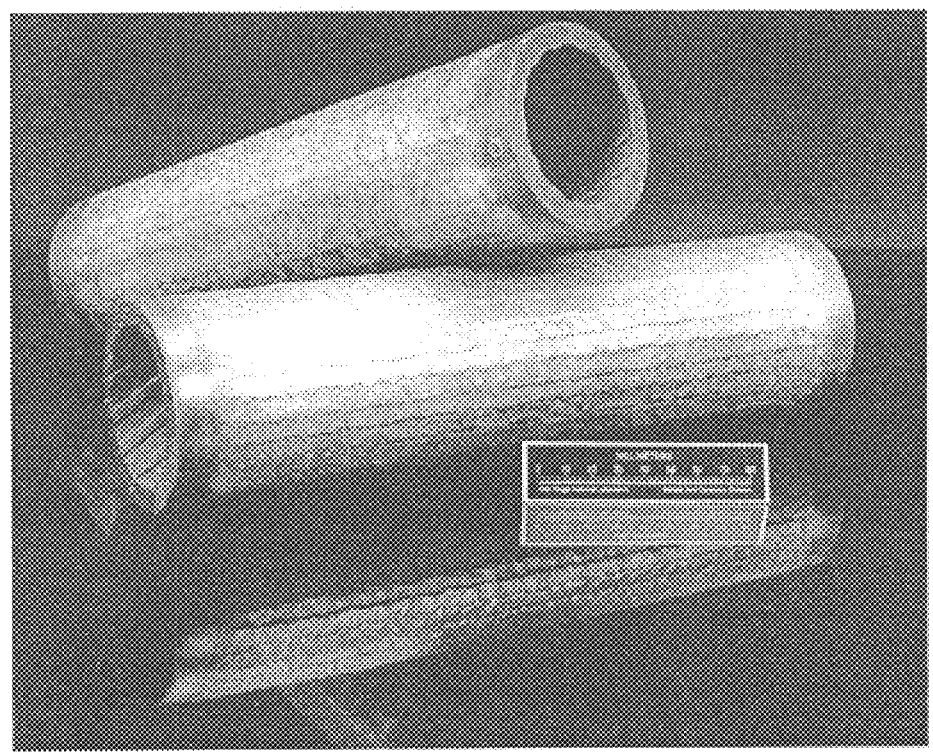
FIG. 2 is a photomicrograph of 75 mm diameter carbon steel tubing aluminized by gas tungsten arc welding.
Figure 3:
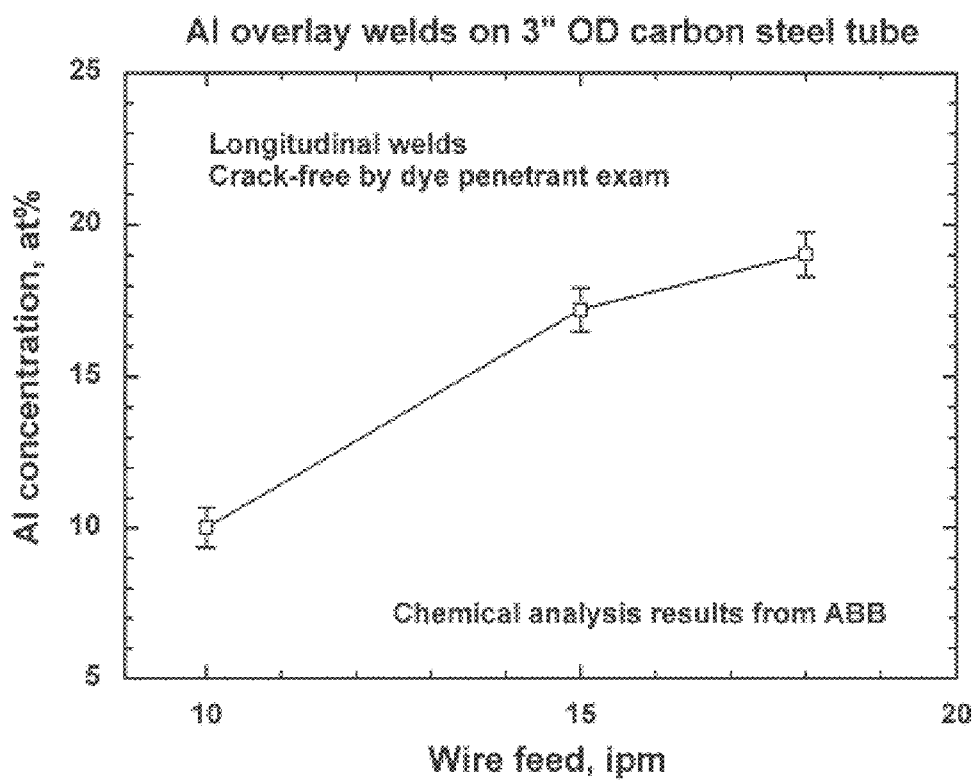
FIG. 3 is a chart showing the variation of aluminum concentration and weld deposits on carbon steel with the rate of addition of aluminum wire into the well puddle.

To further demonstrate this process, several sections of 75-mm-OD carbon steel tubing were aluminized by automatic GTA welding. The use of automatic welding allows for better reproducibility and uniformity of weld overlay thickness and chemical composition. A photograph of two aluminized tubing sections is shown in FIG. 2. For these welds the individual beads were deposited along the tube axes with slight overlapping. The chemical analysis results from specimens taken from several tubes are presented in FIG. 3. Each of these weld overlay deposits was made using identical welding conditions: arc current of 250 A, voltage of 11V, arc travel speed of 10 ipm. However, each weld was made with a 3/64" diameter aluminum wire and a different aluminum wire feed rate, and FIG. 3 shows that as the wire feed rate increased from 10 in/min to 18 in/min the aluminum concentrate in the weld deposit increased from 5.1 wt % (10.0 at %) to 10.2 wt % (19.0 at %). These data confirm that the aluminum concentration in the weld deposits can be controlled and varied.

To assess whether the weld overlay aluminizing improved the environmental resistance of carbon steel, 0.5-in-thick rings were cut from a tube like that shown in FIG. 2 and heated in air to temperatures of 500° C., 750° C., and 1000° C. for 24 h. The oxidation of the carbon steel was dramatically improved by the weld overlay. For example, at 1000° C. the thickness of the weld overlay was unchanged in 24 h, but the thickness of the carbon steel was reduced by 0.040 in.

The uniqueness of this invention is that it uses simple, straightforward processing to aluminize metal alloys for improving their corrosion, oxidation, and sultidation resistance. The processing is capable of making a weld overlay deposit with commercially available aluminum or aluminum alloy filler metal. Thus, relatively inexpensive materials and processing can be used to make high performance coatings. The aluminum alloys with the base metal during welding to produce an aluminum alloy or aluminide deposit that can be relatively thick. The process is also portable, and it can be applied to structures of almost any size, shape and location.

Several alternative embodiments exist within the scope of this invention.

Figure 4:
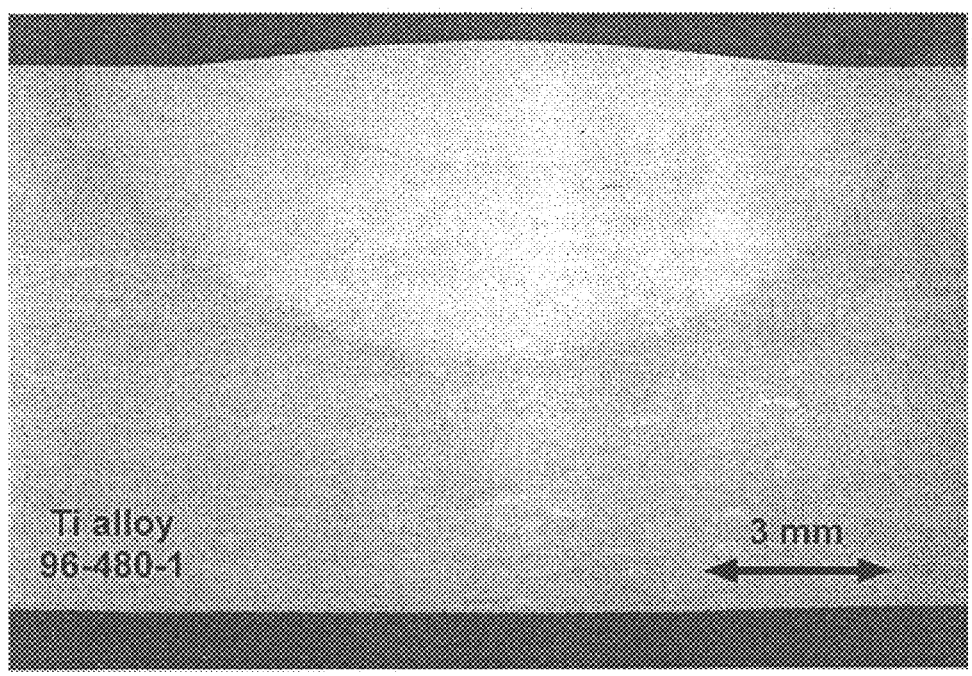
FIG. 4 is a photomicrograph of a cross section of a weld bead made by depositing aluminum wire on titanium alloy using gas tungsten arc welding.

Other base alloys can be aluminized by this process. An example of a weld bead deposited on a titanium alloy is shown in FIG. 4. In this case, the chemical composition of the titanium alloy was Ti-8.3 Al-1.2 Nb-0.25 Ta-0.6 Mo wt %. The aluminum concentration of the weld overlay deposit was increased to 20.6 wt % (31.8 at %).

Overlay layers can be built up to greater thicknesses by alternately depositing aluminum followed by welding filler metal of the base metal composition.

Alloying elements can be added to the aluminum filler metal to modify the chemical composition of the weld overlay deposit.

Alloying elements can be added to the aluminum filler metal to result in a weld overlay deposit that contains hard particles.

Hard particles can be added to the aluminum filler metal to increase the hardness of the weld deposit.

Other welding processes such as, gas tungsten arc welding, laser beam welding, or electron beam welding can be used to make the weld overlay deposits.

Articles produced utilizing the process of this invention have applications in environments where corrosion and oxidation resistance are required, e.g., steam applications such as aircraft catapults, or any boiler environment including particularly boiler tubes. Material handling applications in heat treating environments are also within the scope of this invention.

It is thus seen that this invention provides a novel process for forming aluminum or aluminum alloy layers on suitable substrates to enhance resistance thereof to environmental degradation. It is further seen that such aluminum and aluminum layers can be produced in a variety of thicknesses.

As many modifications will become apparent to those skilled in the art from a reading of the above description which is exemplary in nature, such modifications are embodied within the spirit and scope of this invention as defined by the following appended claims.

What is claimed is:

1. A process for coating a substrate, comprising:

providing a metallic substrate formed from a metal selected from the group consisting of iron based alloys, cobalt based alloys, nickel based alloys, titanium based alloys;

forming a metallic pool on said substrate by applying energy thereto to melt said metal of said substrate;

adding aluminum or an aluminum based alloy to said pool;

melting said aluminum or aluminum alloy in said pool to form an alloy insitu with said metal of said substrate;

forming a weld deposit of an alloy formed from said aluminum or aluminum base alloy and said metal of said substrate;

said weld deposit having an average thickness of about 3 mm and exhibiting no segregation from said metal substrate.

2. The process according to claim 1 wherein said metal of said substrate is an iron based alloy.

3. The process according to claim 1 wherein said metal of said substrate is a cobalt based alloy.

4. The process of claim 1 wherein said metal substrate is a nickel based alloy therein.

5. The process according to claim 1 wherein said metal of said substrate is a titanium based alloy.

6. The process according to claim 1 wherein said energy is applied using gas tungsten arc welding.

7. The process according to claim 6 wherein said gas tungsten arc welding utilizes direct current.

8. The process according to claim 4 therein said gas tungsten arc welding utilizes argon shielding gas.

9. The process according to claim 1 wherein said weld is applied using laser beam welding.

10. The process according to claim 1 wherein said weld is applied using electron beam welding.

11. The process according to claim 1 wherein said aluminum or aluminum alloy is a commercial grade.

12. The article produced by the process of claim 1.

* * * * *